United States Patent
Lin

(10) Patent No.: US 7,639,936 B2
(45) Date of Patent: Dec. 29, 2009

(54) CAMERA MODULE WITH A POSITION DETECTING MECHANISM

(75) Inventor: Jhy-Chain Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 481 days.

(21) Appl. No.: 11/399,798

(22) Filed: Apr. 7, 2006

(65) Prior Publication Data

US 2007/0025715 A1    Feb. 1, 2007

(30) Foreign Application Priority Data

Jul. 29, 2005    (CN)    .................. 2005 1 0036293

(51) Int. Cl.
*G03B 17/00* (2006.01)
*H04N 5/335* (2006.01)
*G02B 7/02* (2006.01)

(52) U.S. Cl. .................. 396/87; 348/294; 348/340; 359/826

(58) Field of Classification Search .................. 396/89, 396/87, 72, 85; 348/236, 249, 250, 272, 348/294, 298, 340, 347; 359/811, 819, 823, 359/826

See application file for complete search history.

(56) References Cited

U.S. PATENT DOCUMENTS

| | | | | |
|---|---|---|---|---|
| 6,381,413 B1 * | 4/2002 | Harada | ......................... | 396/80 |
| 6,791,076 B2 * | 9/2004 | Webster | ....................... | 250/239 |
| 6,813,441 B2 * | 11/2004 | Yamazaki | .................... | 396/82 |
| 2006/0062560 A1 * | 3/2006 | Ito et al. | ....................... | 396/87 |

* cited by examiner

*Primary Examiner*—Rochelle-Ann J Blackman
(74) *Attorney, Agent, or Firm*—Steven M. Reiss

(57) ABSTRACT

A camera module includes a lens holder (10), a lens module (20), a position detecting mechanism (30), and an image pick-up module (50). The lens holder has a recessed portion axially defined in an inner periphery thereof adjacent one end thereof. The lens module is axially movably received in the lens holder. The position detecting mechanism includes a light source (32) disposed in the periphery of the lens holder opposite to the recessed portion to emit a light, and a photo-detector (34) securely received in the recessed portion, and a processor (36). The photo-detector has a plurality of photo-detector components (342) arranged in the recessed portion parallel to each other so that each can separately receive the lights from the light source and transform the light into an electrical signal. The processor is electrically connected with each photo-detector component for transforming the electrical signal into an output signal.

13 Claims, 2 Drawing Sheets

CAMERA MODULE WITH A POSITION DETECTING MECHANISM

BACKGROUND OF THE INVENTION

1. Field of the Invention

The present invention relates generally to camera modules and, more particularly, to a camera module which can detect a position of a lens module in real-time.

2. Discussion of the Related Art

There are many camera modules with auto-focusing function or vari-focus lens built into cameras and camcorders. For camera modules with an auto-focusing function, the camera lens projects an image onto an image sensor, an AF module retrieves a portion of the image for a CPU to process the contrast information, the CPU then activates an auto-focus motor to move the lens into focus. This process repeats until the object is accurately focused on. For camera module with vari-focus lenses, the camera module generally includes at least two lens modules received in a lens holder. One of the two lens module is driven to moves back and forth to change a distance between the two lens modules so as to vary the focal length of the camera module.

The lens module may move back and forth a distance in the camera module in the above-described camera modules. To precisely control the movement of the lens module in the camera module, it is necessary to detect a position of the lens module in the camera module. Nowadays, it is common to evaluate a movement value for the lens module, and the lens module is driven to travel through this movement value by a step motor. However, since the moving of the lens module is not monitored in real-time, the moving of the lens module cannot be precisely controlled. Therefore, there is a difference between a desired movement and a real movement, and there may be cases where a required focus cannot be achieved properly.

What is needed, therefore, is a camera module, which overcomes the above-described problems.

SUMMARY OF THE INVENTION

A camera module includes a lens holder, a lens module, a position detecting mechanism and an image pick-up module. The lens holder has a recessed portion axially defined in an inner periphery adjacent one end thereof. The lens module is axially movably received in the lens holder. The position detecting mechanism includes a light source disposed in the periphery of the lens holder opposite to the recessed portion for emitting a light, and a photo-detector securely received in the recessed portion, and a processor. The photo-detector has a plurality of photo-detector components arranged in the recessed portion parallel to each other for separately receiving the lights from the light source and transforming the lights into an electrical signal. The processor is electrically connected with each photo-detector component to transform the electrical signal into an output signal. The image pick-up module is arranged to receive light from the lens module, the light corresponding to an image.

Other advantages and novel features will become more apparent from the following detailed description when taken in conjunction with the accompanying drawings.

BRIEF DESCRIPTION OF THE DRAWINGS

Many aspects of the camera module with a position detecting mechanism can be better understood with reference to the following drawings. The components in the drawings are not necessarily drawn to scale, the emphasis instead being placed upon clearly illustrating the principles of the present camera module with a position detecting mechanism. Moreover, in the drawings, like reference numerals designate corresponding parts throughout the several views.

DETAILED DESCRIPTION OF PREFERRED EMBODIMENTS

Figure 1:
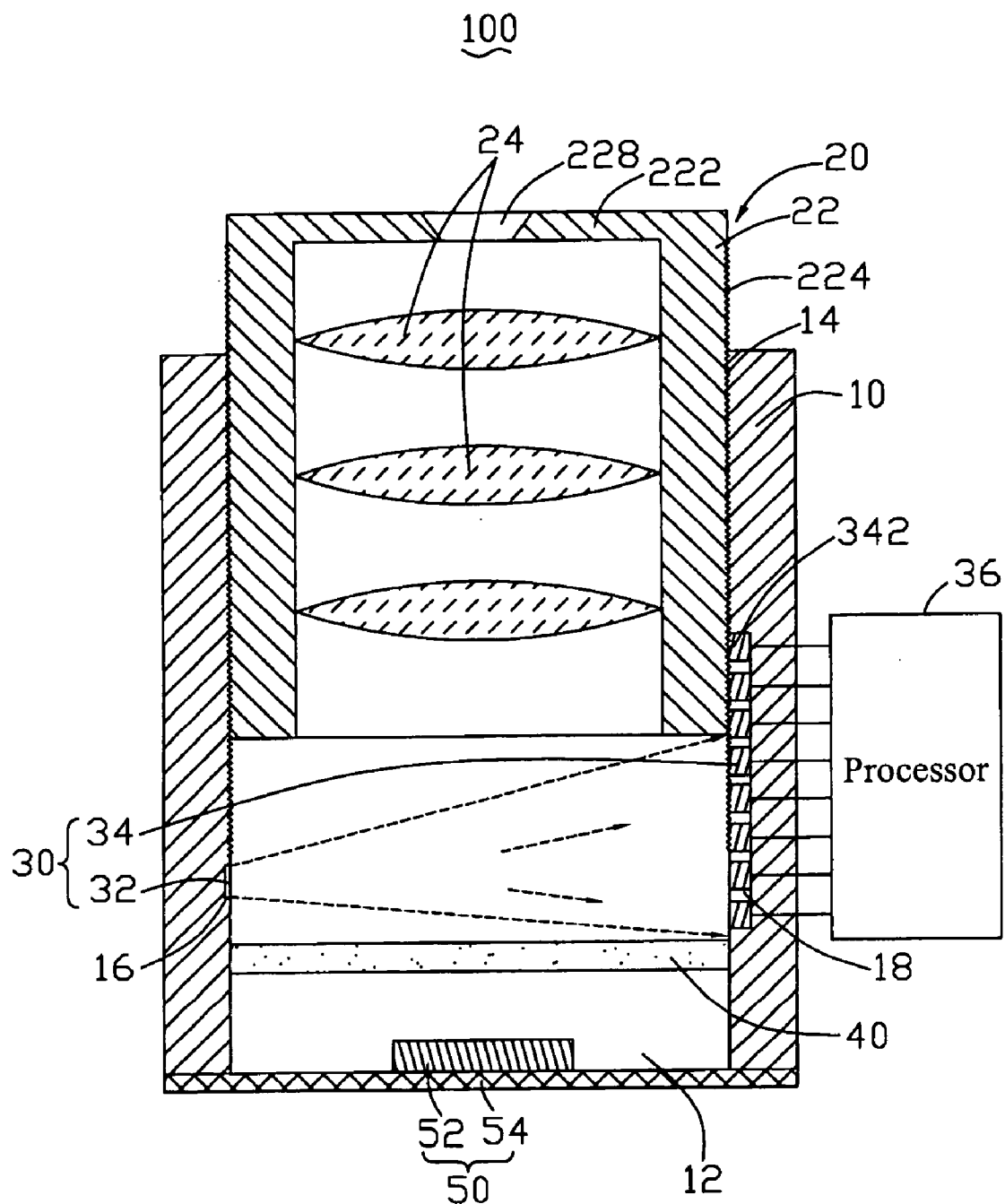
FIG. 1 is an schematic view of a camera module with a position detecting mechanism, in accordance with one preferred embodiment.

Referring now to the drawings, FIG. 1 shows a camera module 100 according to one embodiment. The camera module 100 is adapted for use in portable electronic device (not shown), such as a mobile phone or a Personal Digital Assistant (PDA), but the compact nature thereof could prove useful in compact digital camera units or digital camcorders. The camera module 100 includes a lens holder 10, a plurality of lens modules 20 (only one is shown), a position detecting mechanism 30 for detecting axial position of the lens module 20, an IR-cut filter 40 and an image pickup module 50. The lens module 20 is mounted in the lens holder 10 and can be moved toward or away from the image pickup module 50 in the lens holder 10.

The lens holder 10 is a hollow cylinder with a first open end (not labelled) and a second open end 12 so that lights can be transmitted therethrough. The lens holder 10 defines a receiving cavity (not labeled) inside. The inner periphery of the lens holder 10 is designed with an internal thread 14. The lens holder 10 has a groove 16 defined in the inner periphery thereof adjacent to the second open end 12. The lens holder 10 has a slot 18 as a recessed portion defined in the inner periphery thereof and extending axially some distance from the second open end 12 to the first open end. The groove 16 is opposite to the slot 18.

The lens module 20 includes a lens barrel 22 and a lens group 24 including a plurality of lenses received in the lens barrel 22. The lens barrel 22 is a hollow cylinder with an open end (not labelled) and a half-closed (i.e. partially-closed) end 222. The lens barrel 22 has an external thread 224 on the outside thereof adjacent the open end. The half-closed end 222 has a hole 228 defined therein so that lights associated with the image being received can be transmitted therethrough. The external thread 224 of the lens barrel 22 corresponds to the internal thread 14 of the lens holder 10. The lens module 20 is placed in and engages with the lens holder 10. The lens module 20 is axially located in the receiving cavity of the holder 10. The lens barrel module 20 can manually move axially or automatically move axially under the influence of a driving mechanism such as a step motor (not labelled) installed in the portable electronic device due to the presence of the screw engagement between the lens barrel 22 and the lens holder 10.

The position detecting mechanism 30 includes a light source 32 as a light emitting device, a photo-detector 34 as a light receiving device, and a processor 36. The light source 32 is disposed in the groove 16 of the lens holder 10. The light source 32 can be, for instance, a light emitting diode (LED), or a laser diode. The light source 32 to be used and its wavelength shall be correspondingly matched with the photo-detector 34 to be used. The photo-detector 34 faces opposite the light source 32. The photo-detector 34 is in the form of a matrix. The photo-detector 34 comprises a plurality of photo-detector components 342 arranged in the slot 18 of the lens holder 10 in parallel such that each photo-detector component 342 is arranged to separately detect the lights from the light source 32. A distance between each two photo-component 342 is a fixed value. The photo-detector component 342 can be a charge coupled device (CCD) or complementary metal-oxide semiconductor (CMOS) cell. Each photo-detector component 342 of the photo-detector 34 transfers a respective optical signal into an electrical signal. In this embodiment, the light source 32 is a laser diode, which emits an invisible light as a detective light, preferably having a wavelength of 1550 nanometers. The number of photo-detector components 342 is eight for an exemplary embodiment.

The processor 36 is electrically connected to the photo-detector 34, which is arranged to determine the electrical signal on the basis of each photo-detector component 342 of the photo-detector 34. The electrical signal from each photo-detector component 342 is transmitted to the processor 36, which transfers the electrical signal into a normalized digital signal.

The IR-Cut filter 40 is disposed behind the lens module 20. The IR-Cut filter 40 can prevent incident infrared light rays from reaching the image pick-up module 50.

The image pick-up module 50 includes an image pick-up sensor 52, and a printed circuit board 54. The image pick-up sensor 52 can, for example, be a CMOS type sensor or a CCD. The image pick-up sensor 50 is electrically connected with the printed circuit board 52. The image pick-up sensor 52 is disposed on the center of the printed circuit board 54. The image pick-up sensor 52 aligns with the open end of the lens barrel 22 and the lens holder 10 such that the lens holder 10 and the lens barrel 22 are capable of routing the input lights to the image sensor 52. The printed circuit board 54 is electrically connected with a signal processing unit (not labelled) capable of producing an image signal which is then outputted.

In assembling the camera module 100, the light source 32 and the photo-detector 34 are respectively secured in the groove 16 and the slot 18 of the lens holder 10. Then, the lens holder 10 is fixed on the print circuit board 54 of the image pick-up module 50 with adhesive or other means, with the image pick-up sensor 52 aligning with the open end of the lens holder 10 to receive a light signal thereupon. Then, the lens module 20 is rotated into and mounted on the lens holder 10, with the external thread 224 of the lens barrel 22 engaging with the internal thread 14 of the lens holder 10.

In use, the camera module 100 is installed within a portable electronic device (not shown), such as mobile phone. The light source 32 is electrically connected with a circuit board of the mobile phone to supply electrical power. Firstly, the light source 32 is turned on and emits lights. When the lens module 20 is in a home position in which a distance between the lens module 20 and the image pick-up sensor 52 is largest, and a distance between the lens module 20 and other lens module is small, there are no photo-detector components 342 covered by the lens barrel 22. In this state, all photo-detector components 342 can receive and transfer their respective optical signals into electrical signals, which are then transmitted to the processor 36 and transformed into digital signals. When changing a focal length of the camera module 100, the lens module 20 is driven to rotate relative to the lens holder 10 by a step motor or manually, the lens barrel 22 of the lens module 20 moves axially toward the image pick-up sensor 52. During the moving process of the lens module 20 in the lens holder 10, the exposed photo-detector components 342 receive and transform their respective optical signals into electrical signals, which are then transmitted to the processor 36 and transformed into a series of digital signal. A user can detect the real-time movement position and movement value of the lens module 20 according to the output digital signal from the processor 36. When the processor 36 shows that there are three photo-detector components 342 which cannot receive the lights from the light source 32, as shown in FIG. 1, the lens module 20 is in a first proper focus position. The lens module 20 stops moving and in this state, a user can take picture in this focus position.

Figure 2:
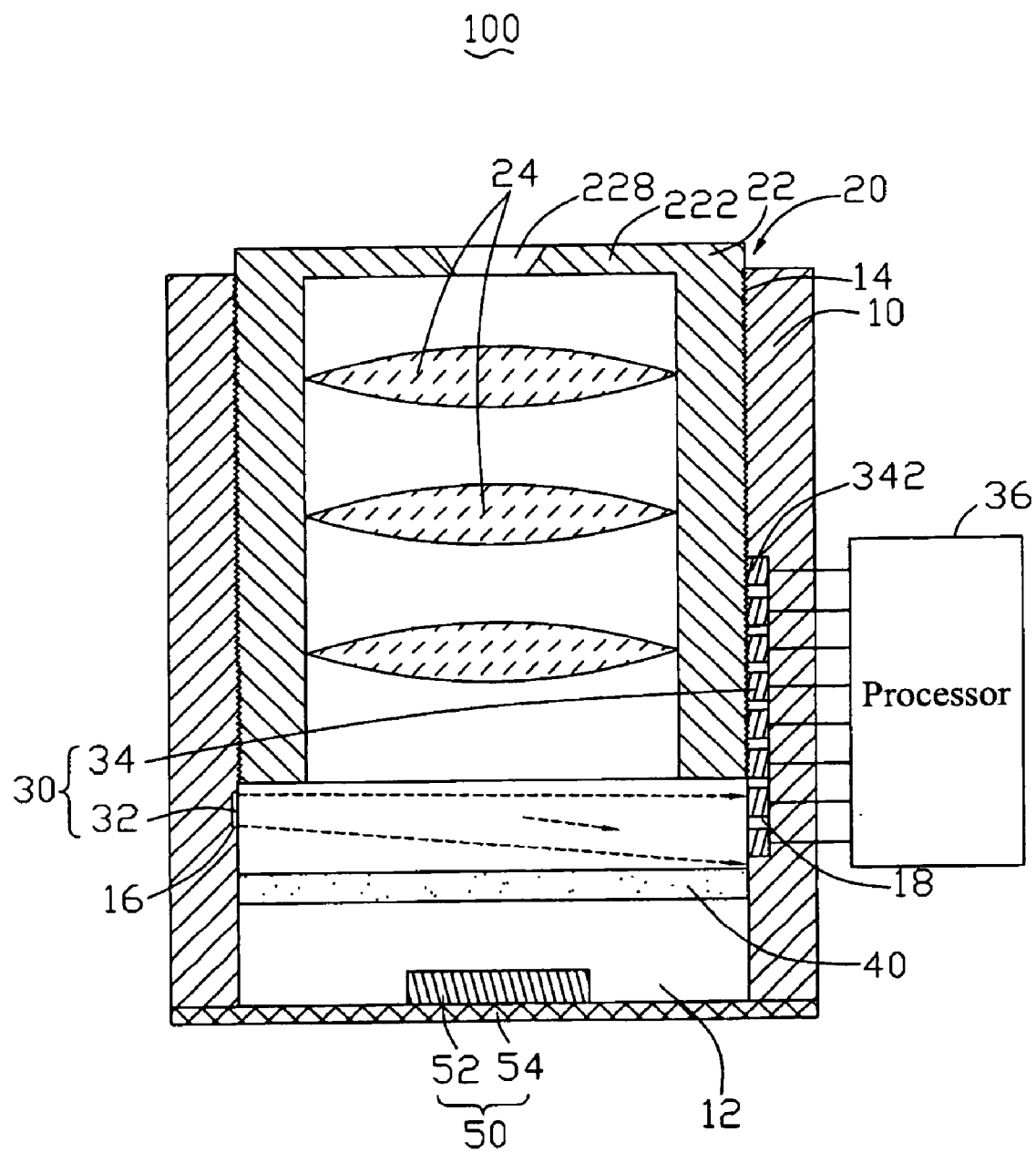
FIG. 2 is similar to FIG. 1, but showing another state.

When changing the focal length of the camera module 100 again, the lens module 20 is driven to rotate relative to the lens holder 10 by a step motor or manually, the lens barrel 22 of the lens module 20 thus moves axially toward the image pick-up sensor 52. Similarly, the user can detect movement position and movement value of the lens module 20 in real-time according to the output digital signal during the movement process of the lens module 20. When the lens module 20 is in a second proper focus position, the lens module 20 stops rotating and moving as shown in FIG. 2, a user can then determine position of the lens module from the digital signal of the processor 36. In this state, a user can take pictures in this focal length. Thus, the real-time detection of the lens module position is achieved via the position detecting mechanism 30.

It can be understood that, in this embodiment, the light emitting device is configured for emitting a detective light, and the light receiving device is configured for receiving the detective light. Therefore, a light communication is established between the light emitting device and the light receiving device. Axial movement of the lens module can control "ON" or "OFF" of the light communication therebetween, that is, for example, if the lens module stops in a position to cover the light receiving device or photo-detectors of the light receiving device, the light communication is made "OFF"; if the lens module stops in another position to expose the light receiving device or photo-detectors of the light receiving device, the light communication is made "ON". Thus, position of the lens module is able to be determined by detecting the light communication.

It can be understood that only one lens module is adopted in this embodiment. When the lens module 20 moves axially relative to the lens holder 10 toward or away the image pickup sensor 52, an auto-focusing function can be achieved and detected in real-time. Also, the position of the lens module can be detected by the processor 36.

It should be noted that only preferred current light sources and photo-detectors applicable to the invention are described herein by way of example. The implementation of the invention is, however, not restricted to the used laser and/or photo-detector or the wavelengths these utilize, but as the technology advances, it is also possible to use as the light source and photo-detector, components made of other materials and using other wavelengths.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera module comprising:
   a lens holder having a recessed portion axially defined in an inner periphery thereof adjacent one end thereof; and
   a lens module axially movable received in the lens holder for transmitting a first light outside the camera module therethrough;

a position detecting mechanism comprising:
  a light source disposed in the periphery of the lens holder opposite to the recessed portion for emitting a second light;
  a photo-detector securely received in the recessed portion, the photo-detector having a plurality of photo-detector components arranged in the recessed portion parallel to each other for separately receiving the second light from the light source and transforming the second light into an electrical signal; and
  a processor electrically connected with each photo-detector component for transforming the electrical signal into an output signal; and
an image pick-up module being arranged to receive the first light from the lens module.

2. The camera module as claimed in claim 1, wherein the light source is a laser diode.

3. The camera module as claimed in claim 2, wherein the light source emits lights having a wavelength of about 1550 nanometers.

4. The camera module as claimed in claim 1, wherein the lens holder has a groove defined in inner periphery thereof adjacent the end thereof, the light source being securely received in the groove.

5. The camera module as claimed in claim 1, further comprising an JR-Cut filter received in the lens holder and disposed between the lens module and the image pick-up sensor.

6. The camera module as claimed in claim 1, wherein the recessed portion is a slot.

7. The camera module as claimed in claim 1, wherein the lens holder has internal thread defined in peripheral wall thereof, the lens barrel has external thread defined in outer peripheral wall thereof, the external thread thereof being configured for movable engagement with the internal thread of the lens holder.

8. The camera module as claimed in claim 6, wherein the image pick-up module includes an image pick-up sensor and a printed circuit board, and the image pick-up sensor is electrically connected with the printed circuit board.

9. A camera module comprising:
  a lens holder being essentially a hollow cylinder;
  a lens module axially and movably received in the lens holder and configured for transmitting an image light outside the camera module therethrough;
  a an image pick-up module being arranged to receive the image light from the lens module; and
  a position detecting mechanism for detecting axial position of the lens module, the positioning detecting mechanism comprising a light emitting device configured for emitting a detective light, and a light receiving device configured for receiving the detective light so as to establish a light communication therebetween, wherein the light receiving device comprises a plurality of sensors each configured for receiving the detective light, and the sensors are arranged in an axial direction to be coverable or exposable by axial movement of the lens module, thus movement position and movement value of the lens module could be detected in real-time according to the number of the sensors receiving the detective light during the movement process of the lens module.

10. The camera module of claim 9, wherein the light emitting device is disposed in an inner periphery of the lens holder, and the light receiving device is disposed in the inner periphery opposing the light emitting device.

11. The camera module of claim 9, wherein the light emitting device comprises a light emitting diode.

12. The camera module of claim 9, wherein the sensors further configured for transforming the detective light into an electrical signal, and the positioning detecting mechanism further comprising a processor electronically connected to the light receiving to detect the electrical signal.

13. The camera module of claim 9, wherein the detective sensor is one of a charge coupled device and a complementary metal-oxide semiconductor.

* * * * *

UNITED STATES PATENT AND TRADEMARK OFFICE
CERTIFICATE OF CORRECTION

PATENT NO. : 7,639,936 B2  Page 1 of 1
APPLICATION NO. : 11/399798
DATED : December 29, 2009
INVENTOR(S) : Jhy-Chain Lin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 747 days.

Signed and Sealed this

Ninth Day of November, 2010

David J. Kappos
*Director of the United States Patent and Trademark Office*